US012560185B2

(12) United States Patent
Bueter

(10) Patent No.: US 12,560,185 B2
(45) Date of Patent: Feb. 24, 2026

(54) WORKING CYLINDER, IN PARTICULAR A HYDRAULIC WORKING CYLINDER

(71) Applicant: BÜMACH ENGINEERING INTERNATIONAL B. V., TA Emmen (NL)

(72) Inventor: Josef Bueter, Haren/Altenberge (DE)

(73) Assignee: Bümach Engineering International B.V., TA Emmen (NL)

( * ) Notice: Subject to any disclaimer, the term of this patent is extended or adjusted under 35 U.S.C. 154(b) by 0 days.

(21) Appl. No.: 18/873,171

(22) PCT Filed: Jun. 1, 2023

(86) PCT No.: PCT/DE2023/000044
§ 371 (c)(1),
(2) Date: Dec. 9, 2024

(87) PCT Pub. No.: WO2023/237141
PCT Pub. Date: Dec. 14, 2023

(65) Prior Publication Data
US 2025/0257745 A1      Aug. 14, 2025

(30) Foreign Application Priority Data
Jun. 10, 2022      (DE) ..................... 10 2022 002 094.7

(51) Int. Cl.
*F15B 15/14*          (2006.01)
*F16B 21/18*          (2006.01)
(52) U.S. Cl.
CPC ...... *F15B 15/1438* (2013.01); *F15B 15/1428* (2013.01); *F16B 21/18* (2013.01)

(58) Field of Classification Search
CPC ... F15B 15/1438; F15B 15/1428; F16B 21/18
See application file for complete search history.

(56) References Cited
U.S. PATENT DOCUMENTS 3,136,230 A      6/1964   Buckley
3,722,374 A  *   3/1973   Densmore ............... F16B 21/18
                                                            92/128
(Continued)

FOREIGN PATENT DOCUMENTS

CH             704908 A2      11/2012
DE             1773997 U       9/1958
(Continued)

*Primary Examiner* — Dustin T Nguyen
(74) *Attorney, Agent, or Firm* — Laurence A. Greenberg; Werner H. Stemer; Ralph E. Locher

(57)          ABSTRACT

A cylinder has a coupling portion with a coupling ring and a locking body. A cylinder tube has an inner annular groove and a closure part is disposed in a tube end portion and has an outer annular groove axially open at one side. The annular grooves define an annular groove space that receives a coupling ring. The ring is segmented into a plurality of ring segments. The ring segments abut one another at separating cuts and are configured parallel to one another or open in a concentric direction. The closure part is secured at one axial end by the ring. The locking body is arranged on the closure part and has a circumferential ring surface that defines a pressure contact with the ring and form-fittingly secures the ring in the groove space. The locking body secures the closure part at one axial end by pressure contact with the ring.

6 Claims, 6 Drawing Sheets

(56)          References Cited

U.S. PATENT DOCUMENTS

| | | | |
|---|---|---|---|
| 2015/0159753 | A1 | 6/2015 | Mueller |
| 2020/0271140 | A1 | 8/2020 | Pegram et al. |

FOREIGN PATENT DOCUMENTS

| | | | | |
|---|---|---|---|---|
| DE | 3801076 | A1 | 7/1989 | |
| DE | 102014206109 | * | 10/2015 | ............ F16C 19/546 |
| DE | 102014206109 | A1 | 10/2015 | |
| EP | 2898224 | B1 | 7/2019 | |
| JP | S5196160 | * | 1/1975 | .............. F15B 15/08 |
| JP | S5196160 | U | 8/1976 | |

* cited by examiner

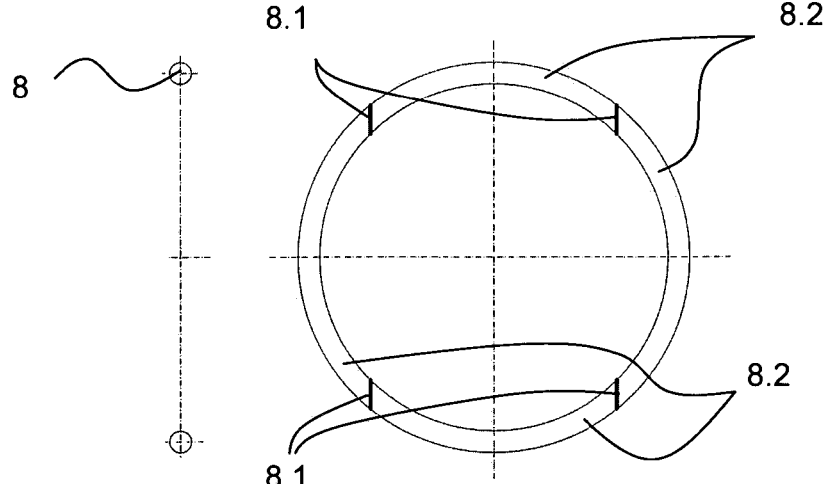
Fig. 5
Fig. 7
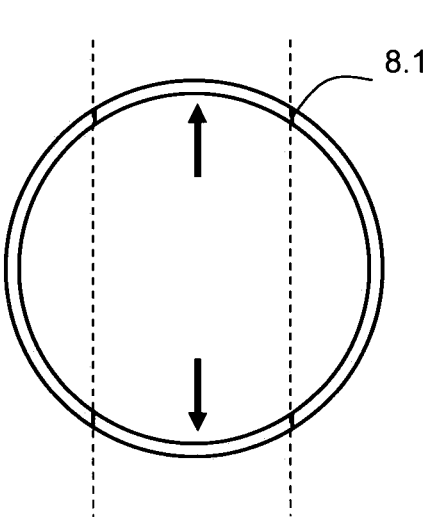
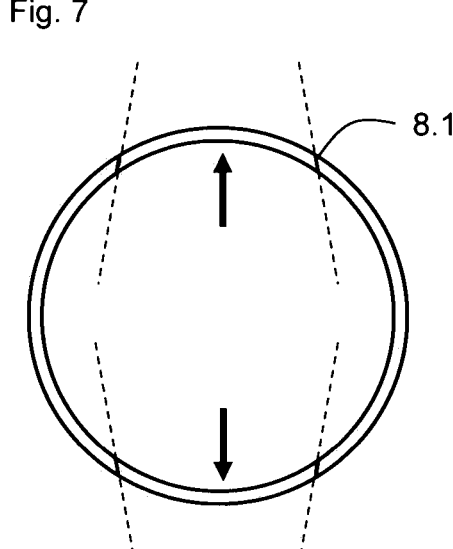
Fig. 6

WORKING CYLINDER, IN PARTICULAR A HYDRAULIC WORKING CYLINDER

FIELD AND BACKGROUND OF THE INVENTION

The invention relates to a working cylinder, in particular a hydraulic working cylinder.

Working cylinders as such are known from the prior art. They usually comprise a cylinder tube and closure parts coupled thereto.

According to the state of the art, a detachable coupling of the closure parts to the cylinder tube for the production of such working cylinders is usually achieved by screw-fastening the closure parts and the cylinder tube. Therefore, these working cylinders are also referred to as screw-type cylinders in the state of the art.

It is further known from the prior art, for example, to connect the bottom closure part to the cylinder tube by MAG welding and then only to screw the guide closure part.

Both screw-type cylinders and cylinders with only one closure part screwed on and MAG welding of the other closure part are available in high quality according to the prior art and have proven to be premium and reliable products.

A disadvantage on the production side is that it is difficult to match the threads of the closure parts and the cylinder tube to each other in such a way that a suitable tightening torque is applied when screwing them together in case of a desired especial angular position of the closure parts relative to each other or to the cylinder tube.

One solution that overcomes this problem is known, for example, from EP 2 898 224 B1. It describes a hybrid coupling combining a form-fitting coupling by means of a spring-loaded coupling ring and a force-fitting coupling by means of an interference fit. This is also a high-quality solution for a detachable coupling which is simultaneously capable to withstand high loads, although special devices are required for mounting and dismounting.

SUMMARY OF THE INVENTION

The task of the invention is to provide a working cylinder that is highly reliable, cost-effective to produce and can be dismounted.

With regard to the working cylinder, the task is solved by the features listed in the independent claim. Preferred further developments result from the dependent claims.

According to the invention, the working cylinder comprises a cylinder and a piston unit as its basic components. It is characterized in particular by a specifically designed coupling section.

The cylinder of the working cylinder according to the invention comprises a cylinder tube, a closure part and a further closure part.

As is known per se for working cylinders, the cylinder tube comprises two opposite cylinder tube end sections (or portions), i.e., one cylinder tube end section and a further cylinder tube end section. The closure part is arranged at the cylinder tube end section and the further closure part is arranged at the further cylinder tube end section. Hereinafter, the cylinder tube end section and the further cylinder tube end section are also referred to collectively as the cylinder tube end sections. Correspondingly, the closure part and the further closure part are also referred to collectively as the closure parts.

The cylinder tube and the closure parts arranged thereon form a cylinder interior. In the cylinder interior, the piston unit forms at least one working chamber. The piston unit is preferably designed as a component group consisting of a piston and a piston rod, wherein the piston rod slidingly passes through one of the closure parts, which is as a guide closure part then. However, the piston unit can also be provided, for example, as a plunger piston or as a piston unit of a double-rod cylinder.

Furthermore, the working cylinder according to the invention is characterized by a specifically designed coupling section.

The coupling section according to the invention comprises the closure part, the cylinder tube end section, a segmented coupling ring and a locking body.

The elements of the coupling section and their interaction are described in the following.

The closure part is arranged such that it is axially inserted into the cylinder tube end section. For this design, the closure part has a cylindrical outer lateral surface, also referred to as the closure part outer lateral surface, and the cylinder tube has a cylindrical inner lateral surface, also referred to as the cylinder tube inner lateral surface. Thus, the closure part is radially enclosed by the inner lateral surface. Both lateral surfaces correspond in their diameter so that the closure part is fixed in its positional relationship relative to the cylinder tube, with the exception of the axial positional relationship, i.e., the linear degree of freedom along the longitudinal axis of the cylinder. Optionally, a supporting press fit may also be provided.

At the cylinder tube end section, the cylinder tube has a circumferential inner annular groove at the inner lateral surface. The contour corresponds to the cross-section of the coupling ring and. for a circular coupling ring cross-section, it is preferably designed to have a substantially semi-circular shape.

And the closure part has an outer annular groove at its outer lateral surface that is open on one side in an axially distal direction. The axially distal direction is understood to be the direction away from the axial centre of the cylinder. Here, the contour also corresponds to the cross-section of the coupling ring and, for a circular coupling ring cross-section, it is preferably designed to be quadrant-shaped.

The inner annular groove and the outer annular groove form an annular groove space in which the coupling ring is arranged. In this design, the coupling ring is radially enclosed by the outer annular groove. Since the outer annular groove at the closure part is designed to be axially open on one side, the annular groove space formed by the two annular grooves is not completely enclosed by the annular grooves either, but is accessible in an axially distal direction.

According to the invention, the coupling ring is segmented by means of separating cuts. It consists of a plurality of coupling ring segments, hereinafter also referred to as ring segments.

The ring segments are arranged at the separating cuts such that they butt against each other. According to the invention, the ring segments rest in a substantially gap-free contact at one another due to the butt-jointed arrangement. In this design, the surfaces of the separating cuts opposite the butt joint are substantially parallel to each other. Furthermore, it is essential to the invention that all of the ring segments together form a virtually gap-free ring body and span an angle of 360 degrees.

Compared to a resilient piston ring with a piston ring gap, this design has the particular advantage that a continuous ring surface or ring line is provided for power transmission between the groove wall of the inner annular groove and the coupling ring, on the one hand, and between the coupling ring and the groove wall of the outer annular groove, on the other.

According to the invention, the separating cuts of at least one piston ring segment are designed parallel or concentrically open to each other. Thus, a surprising solution was found to arrange the coupling ring in the outer annular groove virtually without a gap in the case of an excentric joining direction, whereas this is not possible in the case of radial separating cuts. Being designed parallel is to be understood that the separating cuts at the one end of a ring segment and at the other end of a ring segment have surfaces that are parallel to each other. Being designed concentrically means that the separating cuts have surfaces at the one end of a ring segment and at the other end of a ring segment the plane levels of which are substantially parallel to the longitudinal axis of the cylinder, on the one hand, and, on the other hand, they form an angle that allows the relevant ring segment to be pushed in in a radially excentric direction.

In interaction with the outer annular groove and the inner annular groove, the closure part is axially fixed on one side in a form-fitting manner in a distal direction by means of the coupling ring. In this direction, the full load resulting from the operating pressure is absorbed. Advantageously, the ring surface sections of the inner annular groove and the outer annular groove, which are adapted to the coupling ring, are provided here so that undesired high surface pressures are avoided by sufficiently large surfaces.

Furthermore, the locking body is arranged at the closure part in an axially distal direction by means of a releasable attachment. An axially distal arrangement is understood to mean that the locking body is arranged opposite the axially distal one-sided opening of the outer annular groove. A releasable attachment is understood to be, in particular, a screw connection of the locking body to the closure part. The locking body can be particularly designed as a ring body, if the closure part is a guide closure part, so that a free space remains for the piston rod. In the case of a bottom closure part, the locking body can also be designed as a flat-cylindrical body. Furthermore, the locking body can also consist of several parts.

The locking body has a circumferential ring surface which establishes a pressure contact to the coupling ring and fixes the coupling ring in the annular groove space in a form-fitting manner. The contour of the ring surface can preferably correspond to the cross-section of the coupling ring and, for example, be substantially quarter-shaped. Thus, the locking body can cover the remaining open section of the annular groove space. However, other contours are also possible, for example, partial-circular contours of less than 90 degrees, inclined ring surfaces without a curvature or partial-circular contours with a radius that differs from the coupling ring cross-section in order to optimize, for example, the pressure contact and thus the positional fixing of the coupling ring.

The locking body fixes the closure part in a proximal direction axially on one side by means of the pressure contact to the coupling ring. Here, the load transfer is realized indirectly via the releasable attachment, which, however, is advantageously unproblematic, since only minor forces, caused for example by friction of the piston unit in a guide closure part, have to be absorbed in this direction.

Since the interaction of the outer annular groove, coupling ring and inner annular groove already provides an axially distal positional fixing, the locking body also provides the positional relationship to the cylinder tube in the remaining axially opposite direction. Now, the closure part and the cylinder tube are coupled in a completely form-fitting manner as a result.

The solution according to the invention has the following advantages in particular.

The continuous ring surface or ring line for transmitting forces between the groove wall of the inner annular groove and the coupling ring, on the one hand, and between the coupling ring and the groove wall of the outer annular groove, on the other hand, avoids uneven stresses in the groove areas of the coupling partners, reduces, for example, notch stresses and thus increases the maximum load capacity.

Another advantage is the possible high load capacity because the coupling ring, due to its segmentation, is not required to be resilient, and it can have a large cross-section.

Another advantage is the particularly easy detachability of the coupling. With the appropriate design, it is thus possible to disassemble the locking body by using a screwdriver or wrench with a standard drive, to remove the ring segments and thus to remove the closure part for inspection or repair purposes.

Considering this aspect, the advantage of easy mounting is also of relevance since the ring segments are already fixed radially outwards by the outer annular groove and radially inwards by the closing part before the locking body is to be inserted. Another advantage is the low vulnerability to mounting errors since the locking body cannot be inserted if the ring segments are not properly in place.

The constructive simplicity is particularly advantageous, too, since the cylinder tube, the closure part and the locking body can be provided by means of a conventional turning and milling operation.

According to a first advantageous development, the working cylinder is characterized in that the piston ring has four piston ring segments and all the separating cuts are oriented parallel to each other.

According to this development, there are two similar ring segments of a first type and two similar ring segments of a second type. Here, the ring segments of the same type are arranged opposite each other. When the two ring segments of the first type have been positioned in the inner annular groove, the two ring segments of the second type can be inserted from the centre in a radially excentric direction due to the parallel separating cuts. Thus, the coupling ring can be joined to form a completely closed, virtually gap-free ring body over 360 degrees by means of the four ring segments.

According to another advantageous development, the working cylinder is characterized in that the locking body is arranged with an axial elastic prestress in the proximal direction.

In the case of hydraulic working cylinders, in particular, the coupling between the cylinder tube and the closure parts is subject to high mechanical stress due to the high and changing operating pressures and the associated dynamic loads. In the case of form-fit couplings, this can lead to the development of an undesired clearance, also known as breathing. Such a clearance can develop when the groove walls of the annular grooves and the coupling ring shape-adapt to each other.

The elastic prestress of the locking body leads to a permanent application of force at the ring surface of the locking body to the coupling ring. As far as the coupling ring and the groove walls shape-adapt to each other, the coupling ring is pressed deeper into the annular grooves by this force so that zero clearance is maintained.

According to a further advantageous development based on this design, the working cylinder is characterized in that the releasable attachment of the locking body is achieved by means of cap screws, the respective screw head of each has a single-sided support on the locking body and an axial application of force on the support, and in that the cap screws exhibit an elastic bending relative to the longitudinal axis.

According to this further development, it is intended that the screw heads rest only partially, preferably a half of them, on the locking body. When the cap screws are tightened with a tightening torque, an excentric load is applied on the screw head so that the screw bends at the free shaft end in the direction of the support-free side of the screw head. According to this further development, this bending is within the limits of elastic deformation so that, on the one hand, the screw acts advantageously as a spring element causing the axial elastic prestressing of the locking body in the proximal direction and, on the other hand, simultaneously prevents itself from being unscrewed.

With this constructively simple design, a reliable solution was surprisingly found to counteract breathing and to achieve a particularly long service life of the coupling.

According to a further advantageous development based on this design, the working cylinder is characterized in that the circumferential ring surface of the locking body is designed as a cone.

According to the invention, the circumferential ring surface establishes a pressure contact to the coupling ring. In conjunction with the axial elastic prestressing of the locking body in the proximal direction, the ring surface inclined as a cone causes a force distribution on the coupling ring into an axial and a radial portion, wherein the axial portion presses the piston ring in particular into the outer annular groove of the closure part and the radial portion presses the piston ring in particular into the inner annular groove of the cylinder and thus counteracts the development of clearance and breathing.

According to another further development, the working cylinder is characterized in that a coupling section according to the invention is arranged on both cylinder tube end sections. Both coupling sections have the same basic structure so that the description contents for the coupling section also apply correspondingly to the further coupling section at the opposite end of the cylinder tube. Thus, a solution is advantageously provided which allows access for inspection or repair purposes at both ends of the working cylinder. Moreover, it is advantageously possible to design the cylinder tube in the same way at both ends, thus facilitating production.

BRIEF DESCRIPTION OF THE FIGURES

The invention is explained as an exemplary embodiment in more detail by means of the following figures. They show.

Here, the same reference numerals in the various figures always refer to the same features or components. The reference numerals are also used in the description, if they are not shown in the relevant figure.

DETAILED DESCRIPTION OF THE INVENTION

Figure 1:
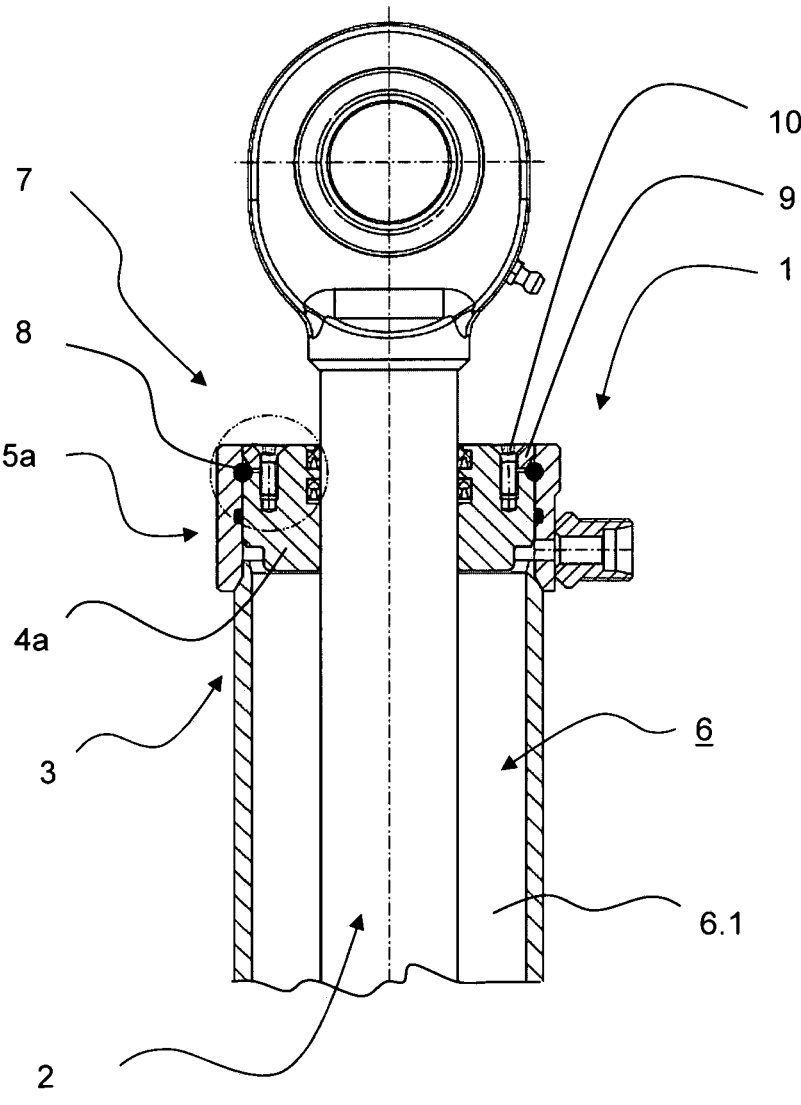
FIG. 1 Sectional view of the coupling section
FIG. 2 Enlarged section of the coupling section
(representation without coupling ring)
FIG. 3 Enlarged section of the coupling section
(representation with coupling ring and axial prestress)
FIG. 4 Sectional view of a working cylinder
(general view)
FIG. 5 Coupling ring with separating cuts
(top view and section)
FIG. 6 Coupling ring with parallel separating cuts
(schematic representation)
FIG. 7 Coupling ring with opening separating cuts (schematic representation)
FIG. 8 Axial view of the coupling section
(representation without piston unit).

FIG. 1 shows an embodiment of a guide-side section of a working cylinder with the coupling section 7 arranged on the cylinder 1 there. The cylinder 1 comprises a closure part 4a, here designed as a guide closure part, and a cylinder tube 3. The cylinder tube end section 5a, which is designed as a separate sleeve in this embodiment, is arranged at the guide-side end of the cylinder tube 3.

Alternatively—not shown here—the cylinder tube 3 can also be designed as a monolithic component. An interior 6 is formed by the closure parts 4a, 4b. Furthermore, the piston rod of the piston unit 2 and the at least one working chamber 6.1, which is formed in this way and is the piston rod chamber in this exemplary embodiment, are shown.

In addition to the cylinder tube end section 5a, the coupling section 7 comprises the coupling ring 8 and the locking body 9 with the releasable attachment 10.

Figure 2:
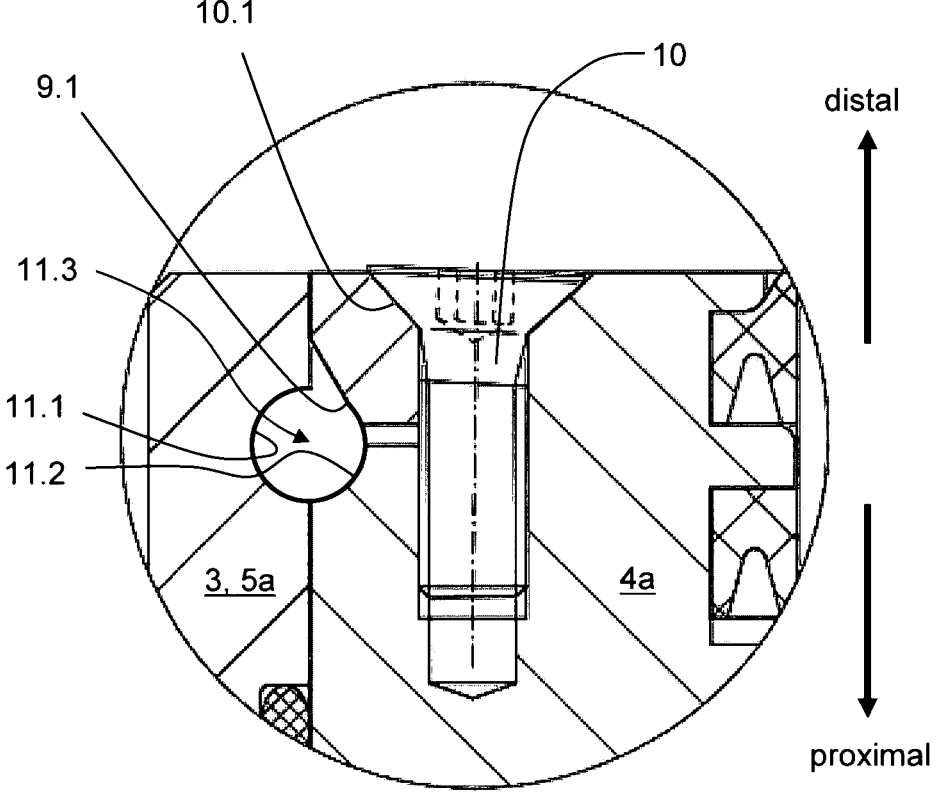

FIG. 2 shows an enlarged view of the coupling section, wherein a representation without the coupling ring 8 is shown in FIG. 2.

At its cylinder tube end section 5a, the cylinder tube 3 comprises an inner annular groove 11.1, which is arranged on the inside at the cylindrical inner lateral surface of the cylinder tube. Corresponding to the circular cross-section of the coupling ring 8 in the exemplary embodiment, the inner annular groove 11.1 has a substantially semicircular contour. The closure part 4a, being radially opposite, has the outer annular groove 11.2 at its cylindrical outer lateral surface, which has a substantially quadrant-shaped contour and is thus open on one side in the distal axial direction. The two annular grooves 11.1, 11.2 span the annular groove space 11.3. In the exemplary embodiment, the locking body 9 has a ring-shaped design and is placed axially in such a way that its circumferential ring surface 9.1 covers the quadrant of the annular groove space still left open by the two annular grooves 11.1, 11.2. Furthermore, the axial directions distal and proximal are indicated by arrows.

Figure 3:
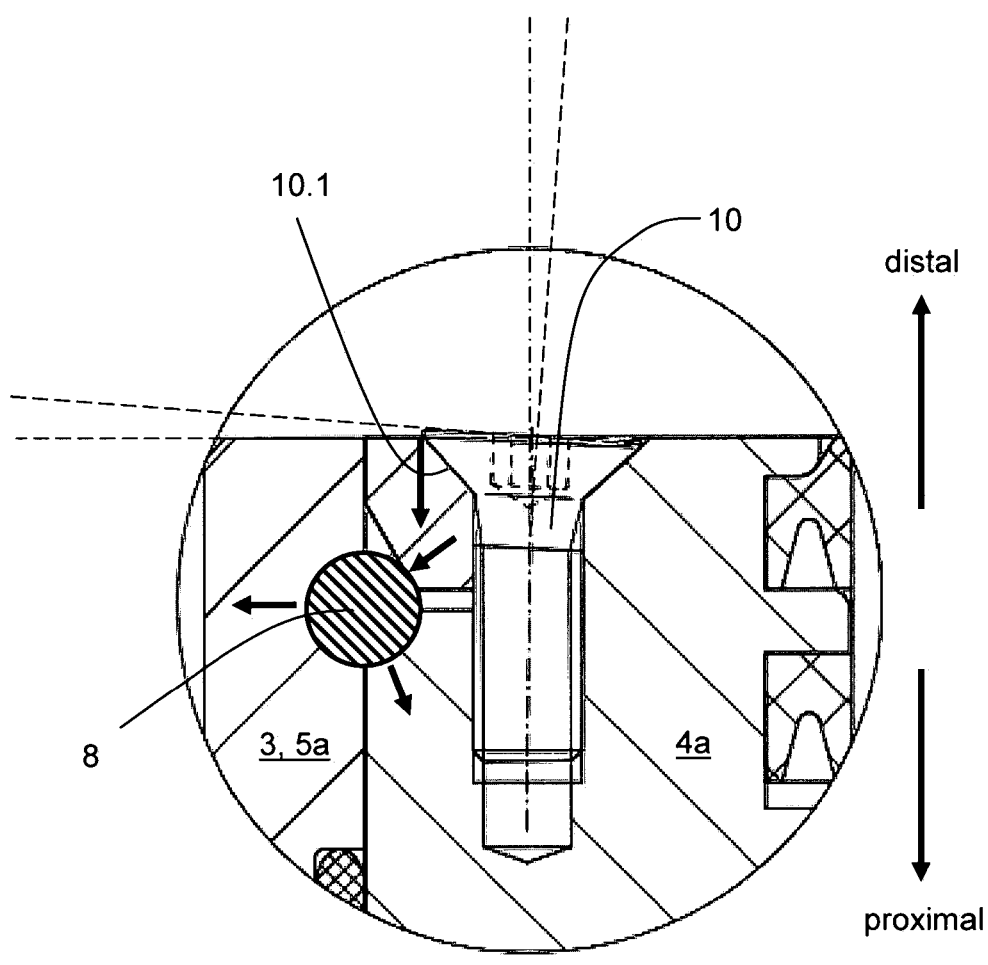

FIG. 3 corresponds basically to FIG. 2, with the additional representation of the arrangement of the coupling ring 8 in the annular groove space 11.3 and the interaction of the releasable attachment with the locking body 9 to generate an axial elastic prestress.

The supporting cone for the head screw, which is provided as a countersunk head screw of the releasable attachment 10, is asymmetrical, wherein a supporting section at the closure part 4a is axially recessed relative to a supporting section at the locking body 9. Thus, a single-sided support 10.1 at the locking body 9 is given when the countersunk head screw is screwed in. When a tightening torque is applied, the countersunk screw bends due to the one-sided application of force on the screw head, as shown by the auxiliary lines (dashed lines). The upper section bends against the longitudinal axis and the axial plane surface of the screw head is inclined. With an even higher tightening torque, the screw head is now additionally supported at the deeper support zone at the closure part. This prevents bending beyond the elastic range and simultaneously protects the countersunk head screw against loosening.

As a result of the releasable attachment 10 acting as a resilient clamping element, the locking body 9 is elastically prestressed in the axially proximal direction and transmits a force to the coupling ring 8 via the circumferential ring surface 9.1. The circumferential ring surface is designed as a cone and thus has an inclined contour, which advantageously has a force-transforming effect as an inclined plane and thus increases the force for pressing the coupling ring into the annular grooves 11.1, 11.2. In this way, it is advantageously prevented that a clearance can develop as a result of the high and dynamic operating loads, which are acting axially in the distal direction and can cause the working cylinder to breathe.

Figure 4:
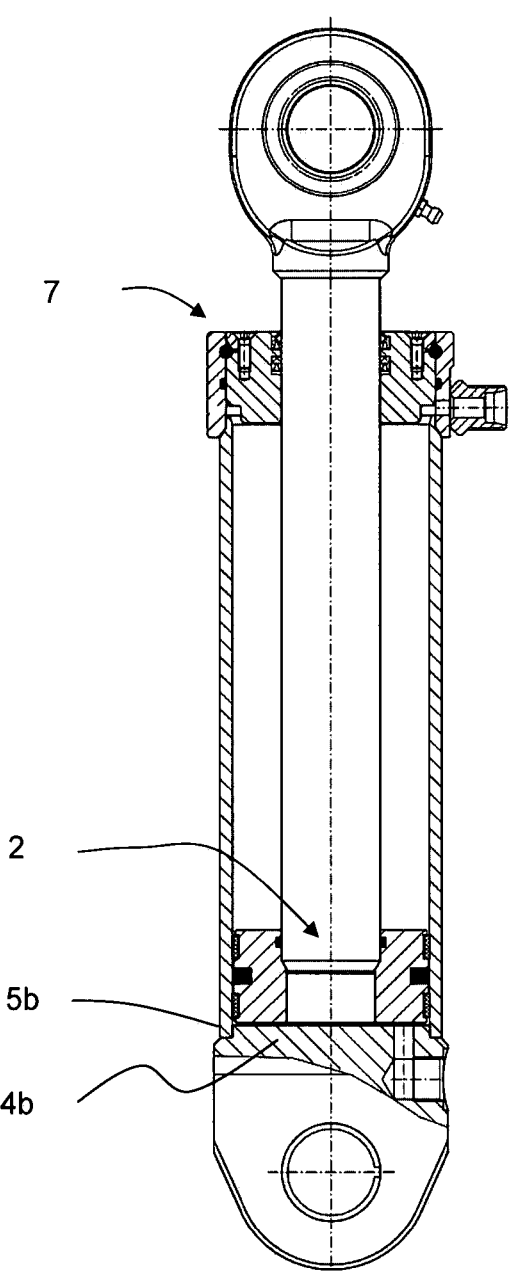

FIG. 4 shows, as an addition to FIG. 1, a general view which also illustrates the further cylinder tube end section 5*b* and the further closure part 4*b*, which is provided as a bottom closure part. However, in the exemplary embodiment shown in FIG. 4, a coupling according to the invention between the further cylinder tube end section 5*b* and the further closure part 4*b* is not provided, but a laser welding coupling is realized here.

FIG. 5 shows a four-part design variant of the coupling ring 8. Here, all separating cuts 8.1 are aligned in parallel. Four coupling ring segments 8.2 are formed by the four separating cuts 8.1.

FIG. 6 shows, as an addition to FIG. 5, a schematic representation of the exemplary embodiment with parallel separating cuts 8.1. Two coupling ring segments 8.2 of the same type are provided there. First, the two coupling ring segments of the first type (shown on the left and right) can be positioned in the inner annular groove 11.1. Subsequently, the two coupling ring segments of the second type (shown above and below) can each be inserted between the coupling ring segments 8.2 of the first type by means of an excentric radial joining movement. The respective joining movement of the coupling ring segments 8.2 of the second type is indicated by the two arrows. After joining, there is a butt-jointed, gap-free contact of all coupling ring segments 8.2 provided so that a virtually uninterrupted power transmission is made available over a range of 360 degrees between the cylinder tube 3 and the closure part 4*a*.

FIG. 7 corresponds basically to FIG. 6 so that the contents of the description given there apply in a corresponding manner. However, in contrast to the embodiment in FIG. 6, the separating cuts 8.1 in FIG. 7 are designed in an angular position which opens in a radial-concentric direction.

During the joining movement of the coupling ring segments 8.2 of the second type, the joining between the coupling ring segments 8.2 of the first type is thus facilitated on the one hand, and, on the other hand, a pressure contact is produced at the separating cuts 8.1 by the cone-shaped inlet, which supports the gap-free positioning of the coupling ring segments 8.2 relative to each other.

Figure 8:
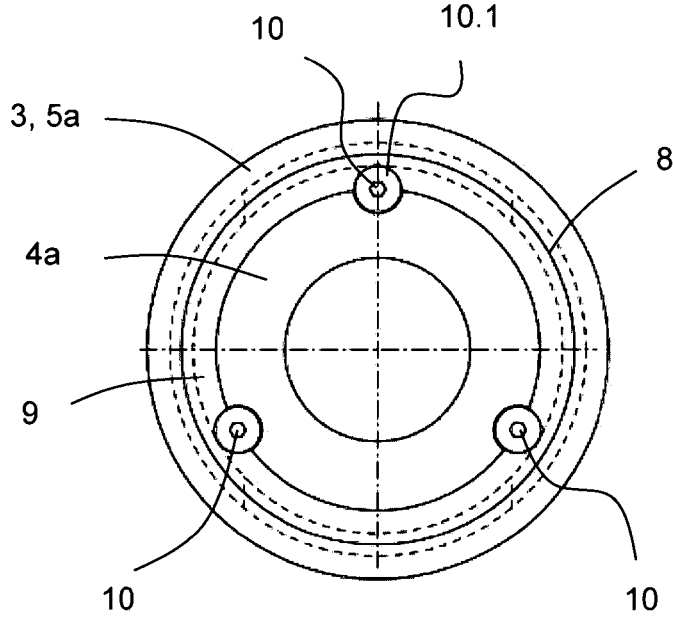

FIG. 8 finally shows an axial view of the cylinder 1, but without illustrating the piston unit 2. The non-visible coupling ring 8 is represented by the two concentric dotted lines.

Here, the locking body 9 is designed as a ring body which in this way surrounds the passage of the piston rod. The releasable attachment 10 is produced by three screws which are arranged at an angle of 120 degrees, and the head of each of them rests with the single-sided support surface 10.1 on one side on the locking body as well as on the axially lower support of the closure part 4*a*.

LIST OF REFERENCE NUMERALS

1 Cylinder
2 Piston unit

8

3 Cylinder tube
4*a* Closure part
4*b* Further closure part
5*a* Cylinder tube end section
5*b* Further cylinder end section
6 Cylinder interior
6.1 Working chamber
7 Coupling section
8 Coupling ring
8.1 Separating cuts
8.2 Coupling ring segments
9 Locking body
9.1 Circumferential ring surface
10 Releasable attachment
10.1 Single-sided support
11.1 Inner annular groove
11.2 Outer annular groove
11.3 Annular groove space

The invention claimed is:

1. A working cylinder, comprising: a cylinder including a closure part, a further closure part and a cylinder tube having a cylinder tube end section and a further cylinder end section, said closure part arranged at the cylinder tube end section and said further closure part being arranged at said further cylinder tube end section, said cylinder tube and said closure parts defining a cylinder interior, said cylinder tube including a cylinder tube inner lateral surface having a circumferential inner annular groove formed therein at said cylinder tube end section;

a piston unit defining at least one working chamber in the cylinder interior;

said cylinder having a coupling section including said closure part and said cylinder tube end section, said coupling section including a coupling ring and a locking body;

said closure part having a cylindrical closure part outer lateral surface, said closure part being axially inserted into said cylinder tube end section and being radially enclosed by said cylindrical cylinder tube inner lateral surface, said closure part outer lateral surface having an outer annular groove formed therein and being axially open on a distal side of said cylinder, said inner annular groove and said outer annular groove defining an annular groove space, said coupling ring being arranged in said annular groove space and being radially enclosed by said inner annular groove;

said coupling ring being segmented at separating cuts defining a plurality of coupling ring segments, said coupling ring segments being arranged butt-jointed to one another at said separating cuts, and said coupling ring having four coupling ring segments and all said separating cuts being configured to be parallel to each other;

said closure part being axially fixed on one side in position, in a form-fitting manner in a distal direction by said coupling ring;

said locking body being arranged at said closure part in an axially distal direction by a releasable attachment and having a circumferential ring surface configured for providing a pressure contact to said coupling ring and fixing said coupling ring in said annular groove space in a form-fitting manner, said locking body axially fixing said closure part on one side in a proximal direction in a form-fitting manner by the pressure contact to said coupling ring.

2. The working cylinder according to claim 1, wherein said locking body is arranged with an axial elastic prestress in the proximal direction.

3. The working cylinder according to claim 2, wherein said releasable attachment is cap screws, a respective screw head of which has a single-sided supporting surface on the locking body and an axial application of force on said single-sided supporting surface, and that said cap screws exhibit an elastic bending relative to the longitudinal axis.

4. A working cylinder, comprising:

a cylinder including a closure part, a further closure part and a cylinder tube having a cylinder tube end section and a further cylinder tube end section, said closure part arranged at the cylinder tube end section and said further closure part being arranged at said further cylinder tube end section, said cylinder tube and said closure parts defining a cylinder interior, said cylinder tube including a cylinder tube inner lateral surface having a circumferential inner annular groove formed therein at said cylinder tube end section;

a piston unit defining at least one working chamber in the cylinder interior;

said cylinder having a coupling section including said closure part and said cylinder tube end section, said coupling section including a coupling ring and a locking body;

said closure part having a cylindrical closure part outer lateral surface, said closure part being axially inserted into said cylinder tube end section and being radially enclosed by said cylindrical cylinder tube inner lateral surface, said closure part outer lateral surface having an outer annular groove formed therein and being axially open on a distal side of said cylinder, said inner annular groove and said outer annular groove defining an annular groove space, said coupling ring being arranged in said annular groove space and being radially enclosed by said inner annular groove;

said coupling ring being segmented at separating cuts defining a plurality of coupling ring segments, said coupling ring segments being arranged butt-jointed to one another at said separating cuts, and said separating cuts of at least one of said coupling ring segments are configured parallel or concentrically open to each other;

said closure part being axially fixed on one side in position, in a form-fitting manner in a distal direction by said coupling ring;

said locking body being arranged at said closure part in an axially distal direction by a releasable attachment and having a circumferential ring surface configured for providing a pressure contact to said coupling ring and fixing said coupling ring in said annular groove space in a form-fitting manner, said circumferential ring surface of the locking body having a conical construction, said locking body axially fixing said closure part on one side in a proximal direction in a form-fitting manner by the pressure contact to said coupling ring, said locking body being arranged with an axial elastic prestress in the proximal direction.

5. The working cylinder according to claim 4, wherein said coupling ring has four coupling ring segments and all said separating cuts are configured to be parallel to each other.

6. The working cylinder according to claim 4, wherein said releasable attachment is cap screws, a respective screw head of which has a single-sided supporting surface on the locking body and an axial application of force on said single-sided supporting surface, and that said cap screws exhibit an elastic bending relative to the longitudinal axis.

* * * * *